(12) United States Patent
Singh (10) Patent No.: US 9,995,354 B2
(45) Date of Patent: Jun. 12, 2018

(54) SYSTEMS AND METHODS FOR CLAMPING FORCE ESTIMATION IN ELECTROMECHANICAL BRAKE SYSTEMS

(71) Applicant: GOODRICH CORPORATION, Charlotte, NC (US)

(72) Inventor: Sameep Singh, Beavercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 131 days.

(21) Appl. No.: 15/216,423

(22) Filed: Jul. 21, 2016

(65) Prior Publication Data
US 2018/0023648 A1 Jan. 25, 2018

(51) Int. Cl.
| | |
|---|---|
| *F16D 66/00* | (2006.01) |
| *F16D 65/18* | (2006.01) |
| *B60T 13/74* | (2006.01) |
| *B64C 25/42* | (2006.01) |
| *G01L 5/22* | (2006.01) |
| *F16D 121/24* | (2012.01) |
| *F16D 125/36* | (2012.01) |

(52) U.S. Cl.
CPC ............ *F16D 66/00* (2013.01); *B60T 13/741* (2013.01); *B64C 25/42* (2013.01); *F16D 65/18* (2013.01); *G01L 5/22* (2013.01); *F16D 2066/005* (2013.01); *F16D 2121/24* (2013.01); *F16D 2125/36* (2013.01)

(58) Field of Classification Search
CPC combination set(s) only.
See application file for complete search history.

(56) References Cited

U.S. PATENT DOCUMENTS

| | | |
|---|---|---|
| 7,424,937 B2 | 9/2008 | Henry et al. |
| 2006/0195246 A1 | 8/2006 | Thibault |
| 2007/0282511 A1 | 12/2007 | Henry |
| 2015/0066324 A1 | 3/2015 | Baehrle-Miller et al. |
| 2016/0001752 A1 | 1/2016 | Yasui et al. |
| 2016/0053839 A1 | 2/2016 | Putz |

FOREIGN PATENT DOCUMENTS

| | | |
|---|---|---|
| EP | 1482290 A1 | 12/2004 |
| EP | 1746399 A1 | 1/2007 |
| EP | 3032234 A1 | 6/2016 |

OTHER PUBLICATIONS

Extended European Search Report dated Nov. 22, 2017 in Application No. 17182584.7.

*Primary Examiner* — Anne M Antonucci
*Assistant Examiner* — Renee LaRose
(74) *Attorney, Agent, or Firm* — Snell & Wilmer, L.L.P.

(57) ABSTRACT

An electromechanical brake system may include an electromechanical actuator with a servo motor. A current control is electronically coupled to the servo motor. A resolver is configured to detect an angular velocity and an angular position of the servo motor. A converter may be configured to convert the angular velocity into a linear velocity and the angular position into a linear position. An intelligent observer may also be configured to estimate a load force of the electromechanical actuator based on the linear position and the linear velocity.

19 Claims, 6 Drawing Sheets

SYSTEMS AND METHODS FOR CLAMPING FORCE ESTIMATION IN ELECTROMECHANICAL BRAKE SYSTEMS

FIELD

The present disclosure relates to aircraft brakes, and more particularly, to systems and methods of estimating braking force on an aircraft.

BACKGROUND

Aircraft brakes include alternating stators and rotating discs that rotate about an axis. Wheels of the aircraft are coupled to the rotating discs. The stators and rotating discs are axially enclosed by two outer discs. In order to cause the rotating discs to slow down or stop rotating (i.e., brake), force is applied to at least one of the outer discs, forcing the outer discs, the stators and the rotating discs together. When forced together, friction reduces the angular speed of the rotating discs.

A motor converts electrical energy into mechanical energy that causes the force to be applied to the outer disc using an actuator. The force being applied by an electronic actuator may be used in providing reliable brake operation. Actuators often use a force sensor or load cell to determine the force being applied to the brakes. However, load cells may be expensive, often require individual calibration, produce a high noise level, have hysteresis, and are sensitive to temperature variations.

SUMMARY

An electromechanical brake system is provided according to various embodiments. The electromechanical brake system includes an electromechanical actuator with a servo motor. A current control is electronically coupled to the servo motor. A resolver is configured to detect an angular velocity and an angular position of the servo motor. A converter may be configured to convert the angular velocity into a linear velocity and the angular position into a linear position. An intelligent observer may also be configured to estimate a load force of the electromechanical actuator based on the linear position and the linear velocity.

In various embodiments, the intelligent observer may be trained to estimate the load force based on a training torque load, a training linear position, and a training linear velocity, with the training linear position and the training linear velocity measured in response to an input current trajectory. The training torque load may be the sum of a first product and a second product, with the first product being a measured current multiplied by a torque constant and the second product being a derivative of a measured velocity multiplied by inertia. The intelligent observer may be trained using one or more of the least square error method or expert observations, as described herein. The intelligent observer may be trained to estimate the load force based on a measured current, a linear position, and a linear velocity each measured in response to an input current trajectory.

A method of estimating a load force of an electromechanical brake actuator is also provided according to various embodiments. The method may include the steps of generating a set of rules to estimate the load force based on a plurality of linear velocities and a plurality of linear positions of the electromechanical brake actuator, measuring a linear velocity and a linear position of the electromechanical brake actuator, and applying the set of rules to the measured linear velocity and the measured linear position to estimate the load force.

In various embodiments, the method may include the step of training an intelligent observer to estimate the load force based on a training torque load, a training linear position, and a training linear velocity, with the training linear position and the training linear velocity measured in response to an input current trajectory. The method may also include computing the training torque load by multiplying a measured current by a torque constant to calculate a first product, multiplying a derivative of a measured velocity multiplied by inertia to calculate a second product, and adding the first product to the second product to calculate the training torque load. Generating a set of rules may also include using a least square error method.

An aircraft brake is also provided according to various embodiments. The aircraft brake may include an electromechanical actuator comprising a servo motor, a gear train coupled to the servo motor, and a ball screw coupled to the gear train, wherein the ball screw is configured to translate linearly in response to a rotation of the servo motor. A current control may be electronically coupled to the servo motor with a current sensor is configured to measure a feedback current through the servo motor. The feedback current may be used to generate an input for the current control. A resolver may be configured to detect an angular velocity and/or an angular position of the servo motor. An intelligent observer may be configured to estimate a load force of the electromechanical actuator based on the angular position and the angular velocity.

In various embodiments, the intelligent observer may be configured to estimate the load force based on a linear velocity converted from the angular velocity based on a gear ratio. The intelligent observer may also be trained to estimate the load force based on a training torque load, a training linear position, and a training linear velocity, with the training linear position and the training linear velocity as measured in response to an input current trajectory. The training torque load may be a summation of two products, with the first product being a measured current multiplied by a torque constant and the second product being a derivative of a measured velocity multiplied by inertia. The intelligent observer is trained using the least square error method. The intelligent observer may also be trained to estimate the load force based on a measured current, a linear position, and a linear velocity each measured in response to an input current trajectory The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods of the present disclosure may use modeling to estimate the load applied by an actuator. The estimated load may be used to control the actuator thereby obviating the use of a load cell. In various embodiments, the inverse model of the applied load may be obtained using data derived from the brake system and determining which system input produced a desired trajectory. The least square error method may be used to design a "force observer" or an "intelligent observer." The observers may use fuzzy logic in the actuator control loop to provide a robust solution in a noisy and uncertain environment.

Figure 1:
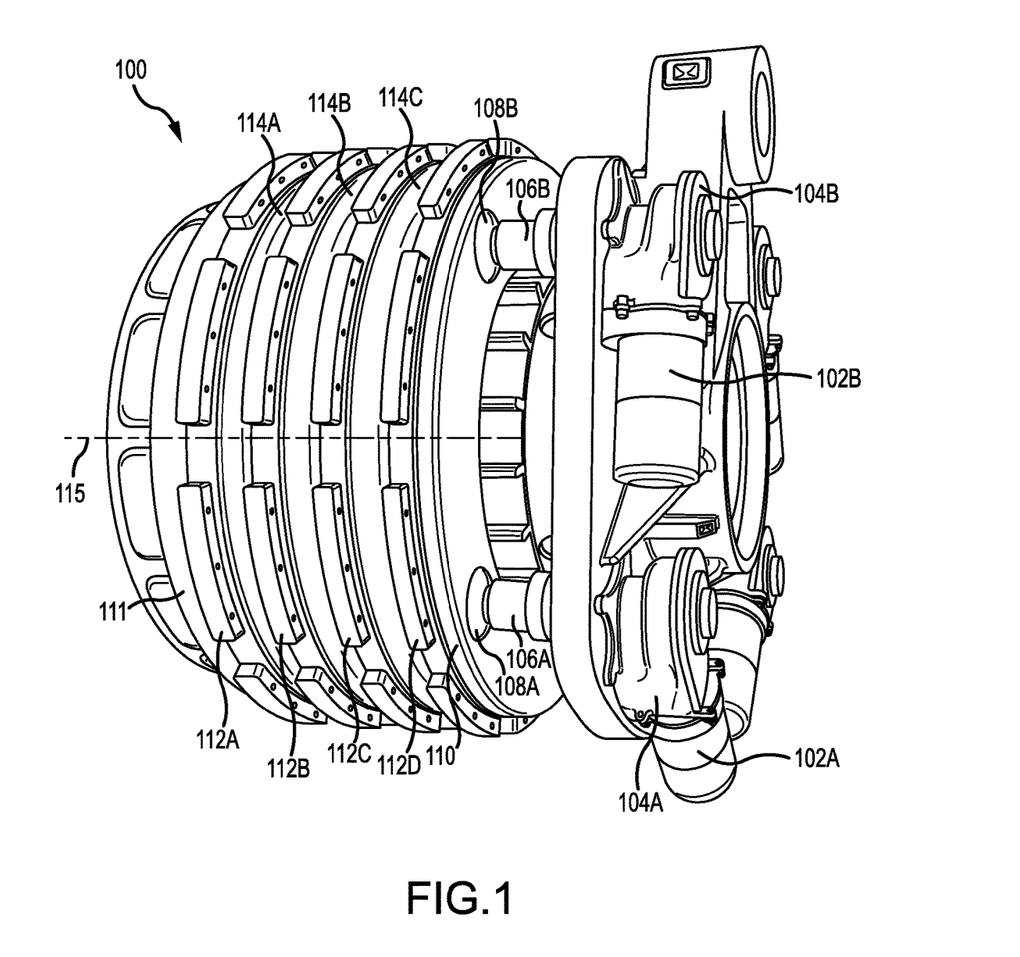
FIG. 1 illustrates an aircraft brake in accordance with various embodiments.

FIG. 1 illustrates an aircraft brake 100 in accordance with various embodiments. Aircraft brake 100 includes a plurality of actuator motors 102A, 102B, a plurality of electromechanical brake (EMB) actuators 104A, 104B, a plurality of ball nuts 106A, 106B, a plurality of pucks 108A, 108B, an outer disc 111 and an outer disc 110, and a plurality of rotating discs 112A, 112B, 112C, 112D and stators 114A, 114B, 114C positioned in an alternating fashion between outer disc 111 and outer disc 110 and collectively forming a brake stack. Rotating discs 112A, 112B, 112C, 112D may rotate about an axis of rotation 115 and the stators 114A, 114B, 114C may have no angular movement relative to axis of rotation 115. Wheels may be coupled to rotating discs 112A, 112B, 112C, 112D such that a linear speed of the aircraft is proportional to the angular speed of rotating discs 112A, 112B, 112C, 112D. As force is applied to outer disc 110 towards outer disc 111 along the axis of rotation 115, rotating discs 112 and stators 114 are forced together in an axial direction. This causes the rotational speed of rotating discs 112A, 112B, 112C, 112D to become reduced (i.e., causes braking effect) due to friction between rotating discs 112A, 112B, 112C, 112D, stators 114A, 114B, 114C, outer disc 111 and outer disc 110. In response to sufficient force being exerted on rotating discs 112 via outer disc 110, the rotating discs 112A, 112B, 112C, 112D will stop rotating.

In order to exert this force onto outer disc 110, actuator motor 102A may cause corresponding EMB actuators 104A to actuate. Actuator motor 102A may be a brushless motor, such as a permanent magnet synchronous motor (PMSM), a permanent-magnet motor (PMM) or the like. When EMB actuator 104A actuates, it causes ball nut 106A to extend towards outer disc 110, thus applying force on outer disc 110 towards outer disc 111. Puck 108A is positioned between ball nut 106A and outer disc 110. Puck 108A may be constructed of a softer and/or more compliant material than ball nut 106A such that when ball nut 106A is forced towards outer disc 110, puck 108A prevents outer disc 110 from becoming damaged.

EMB actuator 104A is actuated in response to current being applied to actuator motor 102A. The amount of force applied by EMB actuator 104A is related to the amount of current applied to actuator motor 102A. It is desirable to determine this amount of force. One way to determine this force is to use a force sensor within aircraft brake 100. However, it may be desirable to determine this force without the use of a force sensor.

Aircraft brake 100 may include a current sensor (such as current sensor 208 of FIG. 2) to detect an amount of current provided to actuator motor 102A. Because the amount of force applied by EMB actuator 104A is related to the current applied to actuator motor 102A, it is possible to estimate the force using the detected amount of current. Thus, a controller or processor may receive the detected current and estimate a force based on the detected current using fuzzy logic, as described in greater below.

Figure 2:
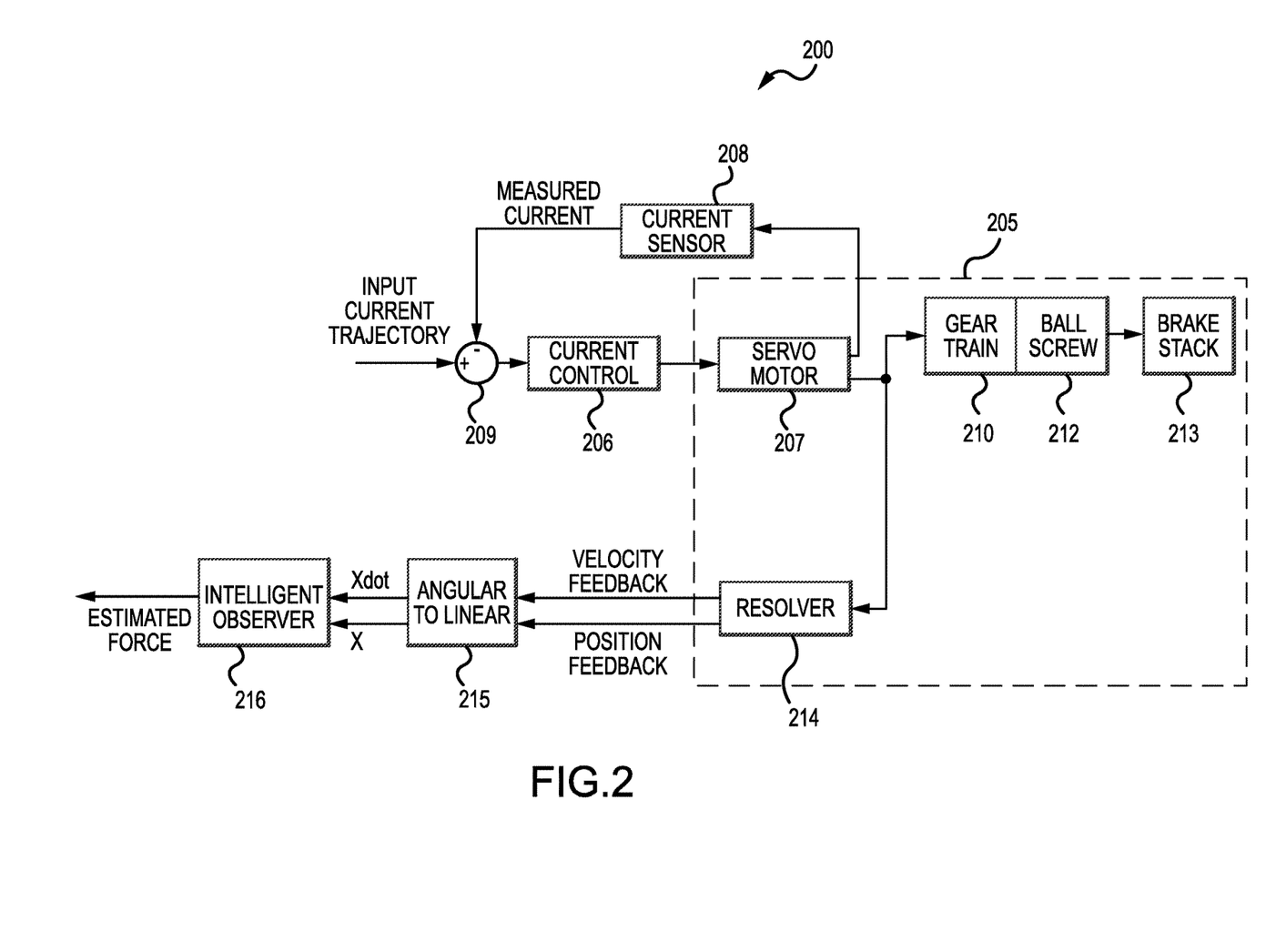
FIG. 2 illustrates a block diagram of an electromechanical brake actuator control system using an intelligent observer to estimate load, in accordance with various embodiments.

FIG. 2 illustrates a block diagram of an EMB system 200 for use in an aircraft, in accordance with various embodiments. Block 205 includes mechanical components of an EMB actuator. Components outside of block 205 may be implemented on one or more controllers, sensors, and/or processors that may be internal to an EMB actuator or external to an EMB actuator. For example, the controller components may be stored in a non-transitory storage medium and performed by a processor, may be stored in a special-use processor, may be implemented in a field programmable gate array (FPGA), or may be operated using another computer-based system. A current sensor 208 may be coupled to a servo motor 207 (similar to actuator motor 102A). Current sensor 208 is configured to detect an amount of current supplied to servo motor 207 and provide a feedback signal to summing junction 209. Servo motor 207 may provide an amount of motive force related, as described in detail below, to the current sent to servo motor 207. A resolver 214 is also coupled to servo motor 207. Resolver 214 measures the rotational position and rotational speed (also referred to herein as angular position and angular velocity, respectively) of servo motor 207. Servo motor 207 is also coupled to a gear train 210 and a ball screw 212 and configured to drive ball screw 212 into brake stack 213 to apply braking force.

An intelligent observer 216 may be electronically coupled to block 205 with an angular-to-linear converter 215 to get linear values for position (X) and velocity (dx/dt, also referred to herein as Xdot or $\dot{X}$) from the angular velocity and/or angular position provided by resolver 214. Intelligent observer 216 may be configured to estimate the force of actuator 104A based on data from resolver 214 and/or angular-to-linear converter, and a rule-based estimation system using fuzzy logic, as described in greater detail below.

An input current trajectory may be compared with the measured current from current sensor 208 in block 209. The output from block 209 may be used as an input to current controller 206, which in turn provides a current to servo motor 207. The EMB system 200 may thus use estimated force from an intelligent observer as a force feedback to control an actuator without using a load cell (i.e., without using a force sensor).

Figure 3:
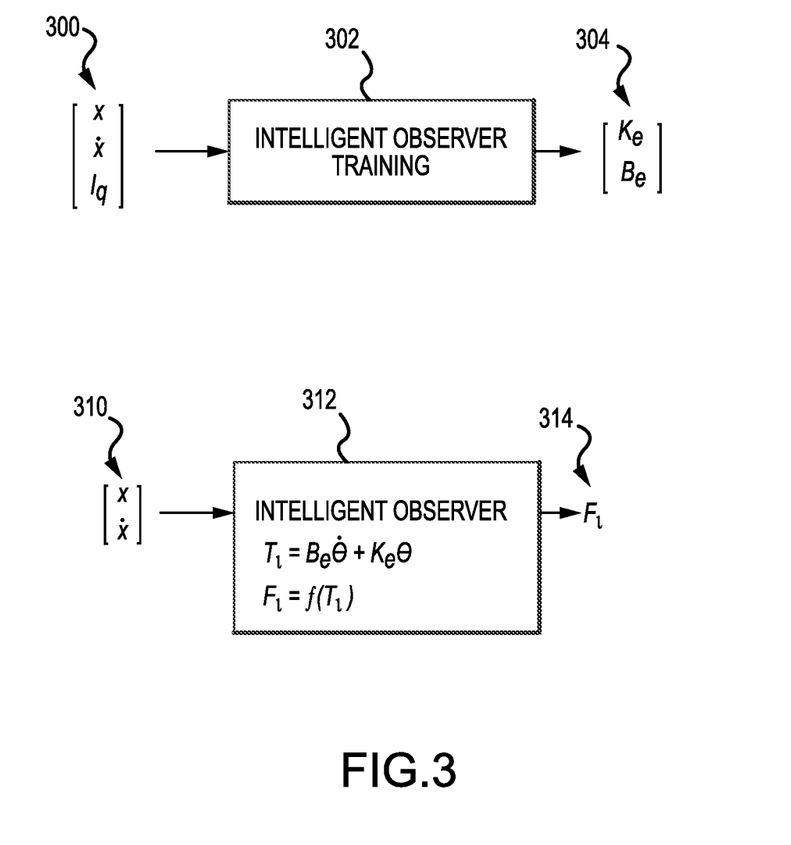
FIG. 3 illustrates a block diagram of the inputs and outputs corresponding to those inputs for training an intelligent observer.

With reference to FIG. 3, a block diagram illustrating intelligent observer training and estimation is shown, in accordance with various embodiments. An input vector 300 comprising a linear position (X), linear velocity ($\dot{X}$), and current ($I_q$) may be input into an intelligent observer training system (as described in greater detail below with reference to FIGS. 3 and 5). It should be noted that linear position (X), linear velocity ($\dot{X}$), and linear acceleration ($\ddot{X}$) may be converted to angular position ($\theta$), angular velocity ($\dot{\theta}$), and angular acceleration ($\ddot{\theta}$) using conversion constants dependent on the known gearing ratios of an EMB actuator. Net torque $T_1$ may also be used in place of $I_q$ for training in various embodiments (as will become clear in view of equation 4 below). The intelligent observer training system may use relationships described in equations 1 through 6 below to generate the relationships described in those equations as $B_e$ (friction coefficient) and $K_e$ (stack stiffness). The output vector 304 may thus correlate values of $B_e$ and $K_e$ with values of X and $\dot{X}$ in a non-linear manner. As a result, during operation of EMB system 200, for example, the intelligent observer may use the non-linear relationships used in its training to take input 310 comprising values of X and $\dot{X}$ and generate output 314 comprising an estimated load force $F_1$.

Figure 4:
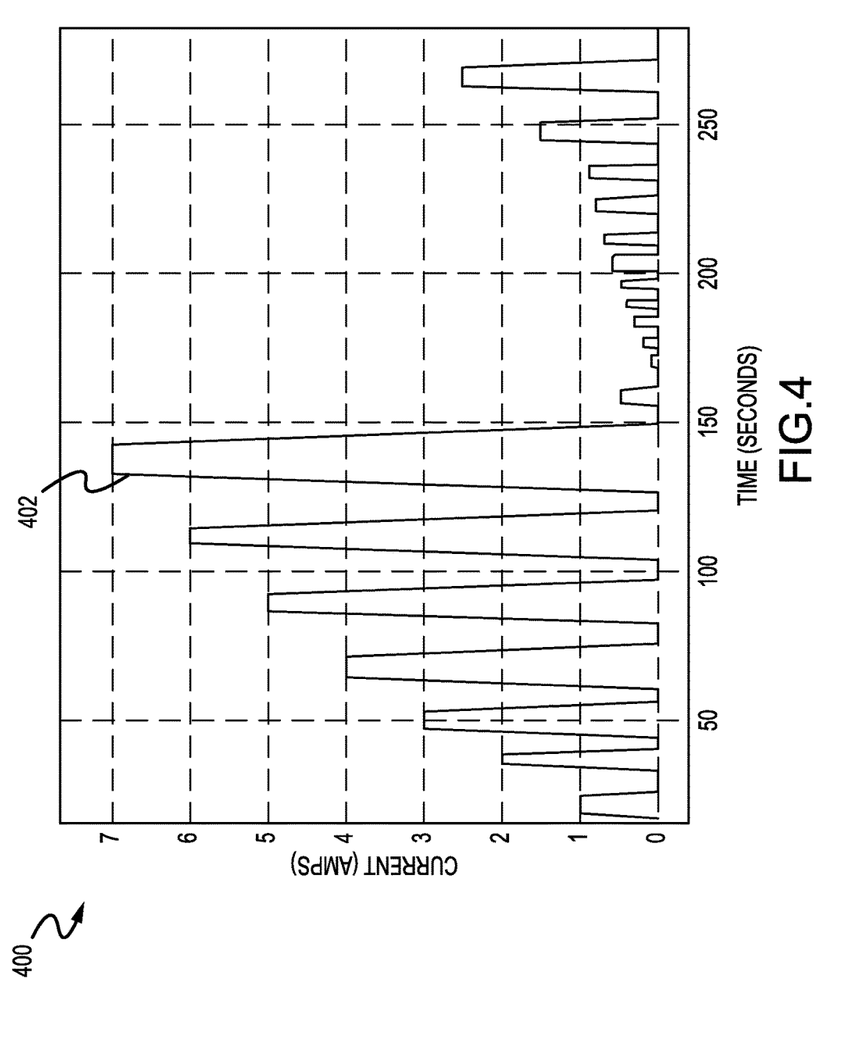
FIG. 4 illustrates an exemplary current trajectory for training an intelligent observer, in accordance with various embodiments.
Figure 5:
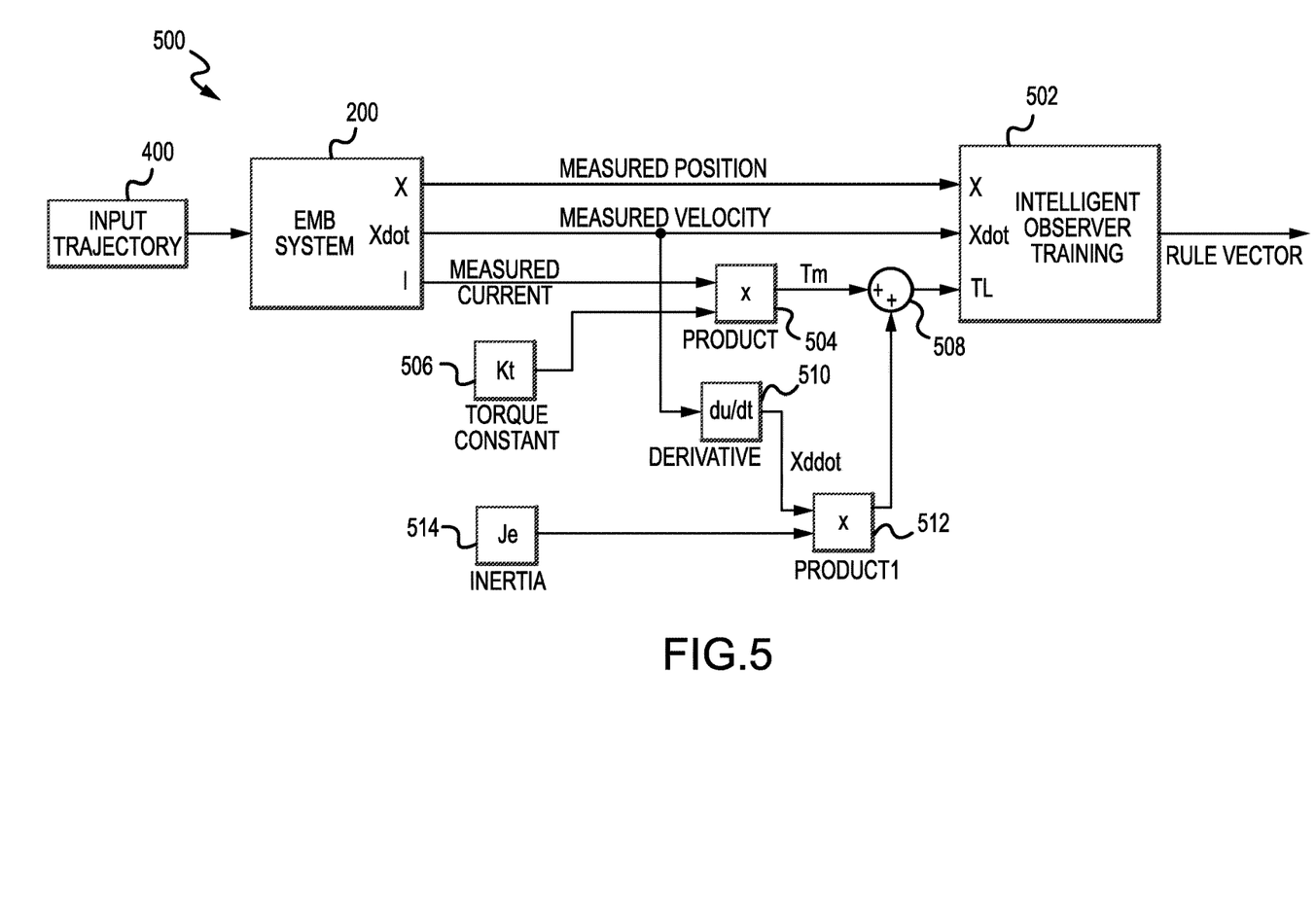
FIG. 5 illustrates an exemplary training system for an intelligent observer, in accordance with various embodiments.

Referring now to FIGS. 4 and 5, an intelligent observer 216 may be trained as described above by using an input trajectory 400 having current profile 402 (illustrated in Amperes versus time) into EMB system 200 and using measured outputs to train the intelligent observer as shown in training system 500. Training is completed to generate a set of rules for intelligent observer 216 to use in estimating load force. Training may be completed prior to system deployment. Training may also be completed after system deployment to update the rules used by intelligent observer 216 in response to changes in the brake system components over time. For example, input trajectory 400 may be used to apply current profile 402 as an input current to EMB system 200.

In the case of EMB actuators, the below described relationships may be used to train the intelligent observer 216 and to estimate force based on current and/or torque, since electromagnetic torque is proportional to the measured current as follows:

$$T_m = Kt^*Iq \tag{1}$$

This motor-generated electromagnetic torque ($T_m$) produces the clamping load torque ($T_L$) or clamping force on the brake, and a relationship exists between these two variables. To determine the clamping force in an actuator using motor current information, a torque balance equation can be solved as follows:

$$Tm = J_e \ddot{\theta} + B_e \dot{\theta} + K_e \theta \tag{2}$$

where $J_e$ is the total motor, resolver, brake and reflected gear inertia of the actuator, $B_e$ is the effective friction, $K_e$ is the effective stiffness of the load and motor shaft. The rotational variables are defined as follows: $\ddot{\theta}$ is angular acceleration, $\dot{\theta}$ is angular velocity, and $\theta$ is angular position.

The torque balance equation shows that the torque developed by the motor is equal to the torque used to provide clamping torque, meet the inertial demands, and overcome frictional resistance. This resistance due to effective friction between motor shaft, gears and ball screw is undefined and difficult to derive in a satisfactory manner. Equation (2) can be rewritten as:

$$Kt^*Iq = J_e\ddot{\theta} + T_L \tag{3}$$

where the function $B_e\dot{\theta} + K_e\theta$ from equation (2) is assumed to be equal to the load torque ($T_L$).

This technique may alleviate using a friction model, which is nonlinear and thus renders estimation more difficult. From equation (3), load torque can be solved as follows.

$$T_L = Kt^*Iq - J_e\ddot{\theta} \tag{4}$$

The load force acting on the actuator from brake stack may be derived using a rotational-to-translational function as shown in equation (5) below. The motor and ball screw transforms the rotational motion of the motor into the linear motor of the screw, thereby pressing the caliper of the actuator into brake stack generating clamp force. This relationship between load force and load torque is given as:

$$F_L = N^*T_L \tag{5}$$

where N is a constant that acts as a gain relating the load torque to the load force (e.g., through a gearing system).

Determining the clamping force may be based on the linear displacement of the ball screw using a look up table and/or brake stack stiffness that estimates force based upon the position input as:

$$F_L = K_{stiffness}^* X_{eff} \tag{6}$$

where $K_{stiffness}$ is the stiffness of the brake stack (i.e., the spring constant of the brake stack in newton/meter or pounds/inch), and $X_{eff}$ is the effective displacement of the actuator into brake stack.

The above equations, when used without intelligent observer training, may not account for changes in brake stiffness, deformation of the brake, and wear of the actuator components and brake stack and therefore may provide inaccurate results as a braking system ages. However, variation in the brake system occurring over the lifetime of parts as a result of wear, ambient conditions, or other changes may be accounted for using a fuzzy logic system in the intelligent observer by training the intelligent observer during operation, or by running an input trajectory 400 through the training system 500. Training system 500 may be a separate brake system added into the aircraft brake system for periodically training intelligent observer 216. Training system 500 may also be a removable system that is used to train an aircraft braking system on the ground and removed for typical flight service.

Referring briefly to FIG. 2, EMB system 200 may include an angular velocity feedback and/or an angular position feedback from resolver 214 that is converted to a linear velocity ($\dot{X}$) and position (X), both of which may be used as an input into intelligent observer training 502 of FIG. 5. Returning to FIG. 5, in addition to velocity ($\dot{X}$) and position (X), the measured current (I) may be used as in input to block 504 where it is multiplied by the torque constant $K_t$ of block 506 to generate electromagnetic torque $T_m$. $T_m$ may be used as an input to block 508. The measured velocity ($\dot{X}$) may be input into block 510 to apply derivative function and output acceleration also referred to herein as Xddot). Acceleration ($\ddot{X}$) may be input into block 512 along with Inertia ($J_e$) of block 514 to multiply the two inputs to generate a product and provide the product as input into block 508. Block 508 may calculate the load torque ($T_l$) and input the load torque into intelligent observer training 502. In various embodiments, the above logic involving blocks 504 through 514 may be integrated into intelligent observer training 502 so that intelligent observer training may accept measured current (I) as an input.

Intelligent observer training 502 is based on the dynamic inverse model (e.g., a feedforward control scheme) of the load system. Intelligent observer training 502 may generate the control commands to track a given trajectory or achieve a desired state. Designing the inverse model may involve capturing the dynamic nature of the system (e.g., the changing stack stiffness $K_e$ and friction coefficient $B_e$ of FIG. 3) as closely as possible to achieve superior tracking. Training data may be obtained from the system to capture the dynamic nature of the system by observing and recording a set of input and output data (as shown in FIG. 3). The system may thus be molded using a training algorithm such as, for example, the Least Square Error (LSE) method, which is described in greater detail below.

In various embodiments, these methods may use the training data collected from the system to obtain a fuzzy rule base. The fuzzy rule base can be derived from a system expert, observation of a human operator, using a linguistic description of the process, or machine learning. While the first three methods for deriving the fuzzy rule base are mainly based upon human input, the fourth removes the human from the main part of the design process and uses learning algorithm to derive the rules. Expert observations of a human operator may be used to generate a rule set. In the expert observation method, the operator may generate a rule set by hand using inputs measured by the operator and outputs measured by the operator. The machine learning approach may, instead of using information from the experts, use data set collected from training system 500 (and/or EMB system 200) to learn the fuzzy rules used to estimate force.

In the LSE algorithm, one set of training data (e.g., command vs output position and velocity) is taken and the corresponding output data is fuzzified. A matrix called the membership matrix (mem_matrix) may be built using the fuzzified output values. All possible combinations of the individual membership of each output data may be taken and built as a row of the membership matrix. The next training data may be taken and the above procedure is repeated. Therefore, for a system with 2 inputs and seven 7 sets each, there are 49 combinations of the membership values of each input. Similarly, for a system with 2 inputs and 5 sets each, there are 25 combinations. The input to the system is formed as a column vector and the rules (which are to be determined) may be generated as a column vector. The method can be represented as:

$$[command]=[mem\_matrix]*[rules] \quad (8)$$

where [command] is the system input vector of the training data and is a column vector, [mem_matrix] is the membership matrix (dimensions P×N) of the data in N input fuzzy sets, [rules] is the unknown rule vector (N×1) of weights of the output fuzzy sets, and P are the number of data points.

The rules can be obtained by taking the pseudo inverse of the matrix, which corresponds to equation (9) below.

$$rules=pinv(mem\_matrix)*[command] \quad (9)$$

For a system with two inputs each having five fuzzy sets, the output may be equal to:

$$command=[mem\_matrix1]*rules*[mem\_matrix2] \quad (10)$$

where [mv1] is the membership vector (1×n) of the first input in n fuzzy sets, [mv2] is the membership vector (m×1) of the second input in m fuzzy sets, and R is the (n×m) rule matrix. In this case the rule vector R obtained will be (25×1) vector. The first five values are the first column of the 5×5 rule matrix; the next five are the second column, and so on.

For a large training set, the scheme may build a large membership matrix, and then determining the inverse of the large membership matrix may create a computational bottleneck. An alternative way to determine the rule may be to use a recursive procedure. A recursive procedure may use a sequential method to compute the rules. A recursive method may thus alleviate the computational bottleneck as the weights are updated sequentially and not as large batch.

Torque, as given in equation (1), in the form of trajectories may be applied to the system and training data for the torque input and output actuator position and velocity is collected from the system. Instead of running a computer simulation, application of input trajectories and acquisition of required data can be done in a lab setup and/or on a live system. The resolver sensor may capture position (and thus velocity) data, whereas current can be captured using current sensor. Since no load cell (i.e., force sensor) is being used to capture input torque, this input torque profile can be calculated using equation (4) as inertia ($J_e$) and torque constant ($K_t$) are known constant values. The position and velocity of EMB actuator are the outputs.

By applying, for example, the recursive least square method described above, the rule base for the intelligent observer may be derived. Position and velocity data may be fuzzified using an odd number of space fuzzy sets for position and velocity (e.g., 5, 7, and 11). Triangular fuzzy sets with fuzzy partitioning may be used as they are easier to implement and membership values always adds up to 1. A final rule vector may be obtained by running different trajectories over the envelope of operation and variability of the EMB system 200. The data obtained should cover maximum number of points in the operating region. Each set of data, i.e. one of set of input data and its corresponding output, is taken one at a time and used to determine the inverse. The size of the inverse model (rule vector) depends on the number of fuzzy sets for position and velocity. This rule vector determines relationship for friction coefficient ($B_e$) and stack stiffness ($K_e$). The performance of the observer can be improved by a greater number of fuzzy sets but this comes with the downfall of being computationally intense due to large resource demands. There is usually a limit to the maximum number of fuzzy sets that can be utilized to improve resolution. The choice of very large number of fuzzy sets without sufficient training data to cover the entire range of fuzzy sets would deteriorate the controller performance. Five, seven, nine, or eleven fuzzy sets may be used, for example.

Figure 6:
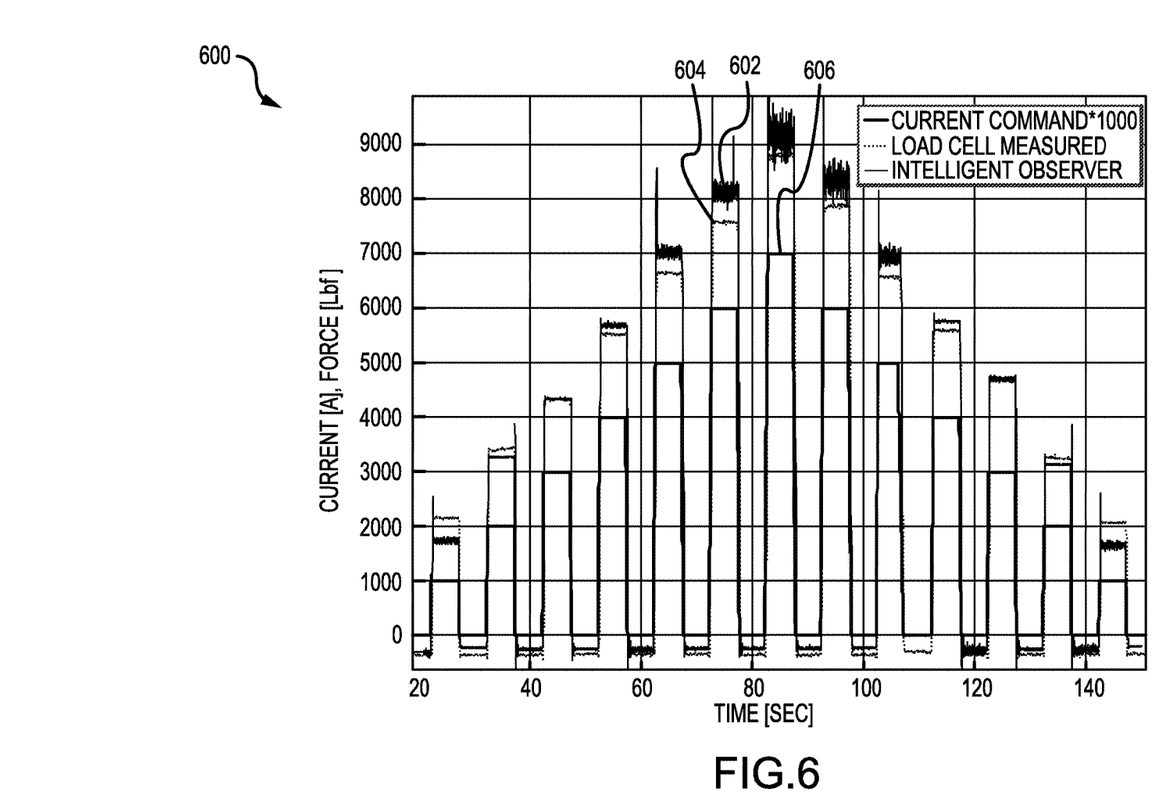
FIG. 6 illustrates an exemplary test result comparing load cell measured force to the intelligent observer estimated force, in accordance with various embodiments.

Referring now to FIG. 6, exemplary test data 600 is shown, in accordance with various embodiments. The performance of the estimated force from the intelligent observer can be compared with the force measured using a force sensor (i.e., a load cell). As illustrated in test data 600, the estimated force of intelligent observer 602 is accurate to within +−500 Lbf of the load cell measured force 604. The result above were derived using a first iteration of the input trajectory 400 used for training and current profile 402 illustrated in FIG. 4, which is overlaid on test data 600 as current command 606. These results may be improved by using data that covers a greater number of points in the operating region. Also further tuning by using different number of fuzzy sets may improve performance of the intelligent observer.

As shown above, the estimated force of intelligent observer, even with a relatively small input trajectory used in training, results in fairly accurate estimations of load force. The load estimations may be used in place of load cell measurements in actuators as force feedback to control the actuator. In aircraft applications, the reduced reliance on load cells may reduce the cost of actuators by eliminating load cells, reduce the impact of noise on load cells, and/or reduce temperature sensitivity of the device by reducing reliance on temperature sensitive load cells.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical brake system, comprising:
   an electromechanical actuator comprising a servo motor, a current control electronically coupled to the servo motor;
   a resolver configured to detect an angular velocity and an angular position of the servo motor;
   a converter configured to convert, by a processor, the angular velocity into a linear velocity and the angular position into a linear position; and
   an intelligent observer configured to estimate, by a processor, a load force of the electromechanical actuator based on the linear position and the linear velocity.

2. The electromechanical brake system of claim 1, wherein the intelligent observer is trained using a least square method to estimate the load force based on a training torque load, a training linear position, and a training linear velocity, with the training linear position and the training linear velocity measured in response to an input current trajectory.

3. The electromechanical brake system of claim 2, wherein the training torque load is a first product added to a second product, with the first product being a measured current multiplied by a torque constant and the second product being a derivative of a measured velocity multiplied by inertia.

4. The electromechanical brake system of claim 2, further comprising:
   a ball screw mechanically coupled to the servo motor; and
   a brake stack with the ball screw configured to apply a braking force to the brake stack.

5. The electromechanical brake system of claim 2, wherein the intelligent observer is trained using machine learning.

6. The electromechanical brake system of claim 1, wherein the intelligent observer is trained to estimate the load force based on a training measured current, a training linear position, and a training linear velocity each measured in response to an input current trajectory.

7. A method of estimating a load force of an electromechanical brake actuator, comprising:
   generating a set of rules to estimate the load force based on a plurality of linear velocities and a plurality of linear positions of the electromechanical brake actuator;
   measuring a linear velocity and a linear position of the electromechanical brake actuator to yield a measured linear position and a measured linear velocity;
   applying the set of rules to the measured linear velocity and the measured linear position to estimate the load force; and
   applying a braking force to a brake stack based on the load force.

8. The method of claim 7, further comprising training, using a least square method, an intelligent observer to estimate the load force based on a training torque load, a training linear position, and a training linear velocity, with the training linear position and the training linear velocity measured in response to an input current trajectory.

9. The method of claim 8, further comprising computing the training torque load by:
- multiplying a measured current by a torque constant to calculate a first product;
- multiplying a derivative of a measured velocity multiplied by inertia to calculate a second product; and
- adding the first product to the second product to calculate the training torque load.

10. The method of claim 7, wherein the generating the set of rules further comprises using a least square error method.

11. The method of claim 7, further comprising applying a braking force to a brake stack based on the load force.

12. The method of claim 7, wherein the generating the set of rules further comprises using machine learning.

13. An aircraft brake, comprising:
- an electromechanical actuator comprising a servo motor, a gear train coupled to the servo motor, and a ball screw coupled to the gear train, wherein the ball screw is configured to translate linearly in response to a rotation of the servo motor;
- a current control electronically coupled to the servo motor, wherein a current sensor is configured to measure a feedback current through the servo motor with the feedback current used to generate an input for the current control;
- a resolver configured to detect an angular velocity and an angular position of the servo motor; and
- an intelligent observer configured to estimate, by a processor, a load force of the electromechanical actuator based on the angular position and the angular velocity.

14. The aircraft brake of claim 13, wherein the intelligent observer is configured to estimate the load force based on a linear velocity converted from the angular velocity based on a gear ratio.

15. The aircraft brake of claim 13, wherein the intelligent observer is trained using a least square method to estimate the load force based on a training measured current, a training linear position, and a training linear velocity each measured in response to an input current trajectory.

16. The aircraft brake of claim 14, wherein the intelligent observer is trained using a least square error method.

17. The aircraft brake of claim 14, further comprising a brake stack with the ball screw configured to apply a braking force to the brake stack.

18. The aircraft brake of claim 13, wherein the intelligent observer is trained using a least square method to estimate the load force based on a training torque load, a training linear position, and a training linear velocity, with the training linear position and the training linear velocity measured in response to an input current trajectory.

19. The aircraft brake of claim 18, wherein the training torque load is a first product added to a second product, with the first product being a measured current multiplied by a torque constant and the second product being a derivative of a measured velocity multiplied by inertia.

* * * * *